United States Patent [19]
Suzuki et al.

[11] Patent Number: 5,891,235
[45] Date of Patent: Apr. 6, 1999

[54] ADDITIVE FOR RESINS, PROCESS FOR ITS PREPARATION AND OLEFIN RESIN COMPOSITION USING THIS ADDITIVE

[75] Inventors: Kazuhiko Suzuki; Hiroshi Ogawa; Hideyuki Nakagawa; Hiroo Inoue, all of Chuo-ku, Japan

[73] Assignee: Mizusawa Industrial Chemicals, Ltd., Tokyo, Japan

[21] Appl. No.: 862,183

[22] Filed: May 22, 1997

[30] Foreign Application Priority Data

May 24, 1996 [JP] Japan ................................. 8-151867

[51] Int. Cl.$^6$ .................................................. C04B 14/04
[52] U.S. Cl. ........................ 106/483; 106/481; 106/482; 106/492
[58] Field of Search ..................... 423/700, 712, 423/714, 718; 106/483, 481, 482, 492

[56] References Cited

FOREIGN PATENT DOCUMENTS

| 0227168 | 7/1987 | European Pat. Off. . |
| 2201407 | 9/1988 | United Kingdom . |
| 2228477 | 8/1990 | United Kingdom . |

OTHER PUBLICATIONS

Database WPI, Section Ch, Week 8404, Derwent Pubications Ltd., London, GB; & JP 58 213 031 A (Mizusawa Chem Ind Co Ltd) 10 Dec. 1983.

Database WPI, Section Ch, Week 8736, Derwent Publications Ltd., London, GB; & JP 62 174 243 A (Mizusawa Chem Ind Co Ltd) 31 Jul. 1987.

*Primary Examiner*—James J. Seidleck
*Assistant Examiner*—U. K. Rajguru
*Attorney, Agent, or Firm*—Sherman and Shalloway

[57] ABSTRACT

An additive for resins, a process for preparing amorphous definite particles used as an inorganic additive, and an olefin resin composition blended with the additive, and an agricultural film blended with the additive and a lithium-aluminum composite hydroxide carbonate. The additive for resins comprises amorphous definite particles having (1) a molar ratio $SiO_2/Al_2O_3$ of from 2.1 to 3.3 on the basis of oxides, (2) an average particle diameter of from 0.3 to 10 μm, (3) a moisture regain at equilibrium (RH90%) of not greater than 10%, (4) a bulk density of from 0.5 to 1.2 g/ml, and (5) a pH in the form of an aqueous suspension of from 6 to 10, said amorphous definite particles being obtained by acid-treating and then heat-treating a Pc zeolite having a spherical particle shape, a notched surface and a molar ratio $SiO_2/Al_2O_3$ of from 2 to 3.4 on the basis of oxides, and said amorphous definite particles further having substantially the same particulate structure as that of said Pc zeolite.

6 Claims, 9 Drawing Sheets

ADDITIVE FOR RESINS, PROCESS FOR ITS PREPARATION AND OLEFIN RESIN COMPOSITION USING THIS ADDITIVE

BACKGROUND OF THE INVENTION

1. Field of the Invention

The present invention relates to an additive (blending agent) for resins, which is blended into olefin resins. More specifically, the invention relates to a blending agent for resins, that imparts excellent properties to the formed films such as anti-blocking property, stability, abrasion resistance and like properties. Particularly, the present invention relates to an olefin resin composition which contains an olefin resin and, particularly, an olefin resin obtained by using a metallocene catalyst and a particular inorganic blending agent, exhibiting excellent properties such as stability, abrasion resistance, antifoaming property and the like properties.

2. Prior Art

Olefin resins such as polyethylene, polypropylene and olefin copolymer have excellent moldability, sanitary properties, mechanical properties and transparency, and can be easily disposed of. Therefore, the olefin resins have been extensively used for a variety of applications in the form of films, such as packaging materials, agricultural films, etc.

In handling these films and, particularly, drawn films, there takes place a so-called blocking which causes the films to intimately adhere to each other making it difficult to peel them off. In order to prevent the blocking, an antiblocking agent has in many cases been blended. Examples of the antiblocking agent include various inorganic particles, such as amorphous silica, alumina, silica-alumina, zeolite and various clays.

Japanese Patent Publication No. 36866/1986 filed by the present applicant discloses an alumina-silica resin blending agent comprising cubic particles having a side of a length of not larger than 5 microns and a molar ratio $Al_2O_3:SiO_2$ of from 1:1.8 to 1:5.

Furthermore, Japanese Patent Publication No. 42367/1993 discloses amorphous silica or silica alumina particles having circularity and ruggedness lying within predetermined ranges, the particles being obtained by synthesizing zeolite particles having an X-ray diffraction image specific to P-type zeolite, clearly spherical shape and rugged surfaces, and treating the zeolite particles with an acid.

Moreover, Japanese Patent Publication No. 17217/1994 discloses amorphous silica-alumina spherical particles obtained by ion-exchanging the P-type zeolite with an alkaline earth metal followed by calcining.

The above-mentioned silica or silica-alumina definite particles offer advantages in that they can be easily blended and dispersed into olefin resins and exhibit antiblocking property, but are not still satisfactory from the standpoint of hygroscopic property, abrasion resistance and stability in combination.

The cubic particles of the above-mentioned first proposal exhibit relatively large abrasion resistance when the films are rubbed by each other. The cubic particles, which is calcined in order to decrease the hygroscopic property, has a great like this.

The spherical particles of the above-mentioned second proposal still exhibit large hygroscopic property and tend to be deformed when they are being blended into the resin and are worked. At the time of production, furthermore, silica in the P-type zeolite elutes out into the reaction medium causing the yield of the object produce to decrease.

The spherical particles according to the third proposal are satisfactory in regard to a large yield of the object product and a relatively small hygroscopic tendency leaving, however, a problem in regard to stability when they are blended into the resin due to their strongly alkaline property. Therefore, the blending agent for resins is decomposed or is colored.

As described above, the blending agent for resins, such as antiblocking agent must assume definite particulate shape such as spherical shape to maintain dispersion property. At the same time, the blending agent must have a pH value which is nearly neutral, must impart stability to the resin composition, must suppress the abrasion resistance to a low level when blended into the resin films, must not exhibit large hygroscopic tendency, and must suppress foaming of the resin.

SUMMARY OF THE INVENTION

It is therefore an object of the present invention to provide an additive (blending agent) for resins of a definite particulate shape satisfying the above-mentioned requirements.

Another object of the present invention is to provide an olefin resin composition which comprises an olefin resin and, particularly, an olefin resin obtained by using a metallocene catalyst and a particular inorganic blending agent, and exhibits excellent properties such as stability, abrasion resistance, antifoaming property and the like properties.

According to the present invention, there is provided an additive for resins comprising amorphous definite particles having (1) a molar ratio $SiO_2/Al_2O_3$ of from 2.1 to 3.3 on the basis of oxides, (2) an average particle diameter of from 0.3 to 10 μm, (3) a moisture regain at equilibrium (RH90%) of not greater than 10%, (4) a bulk density of from 0.5 to 1.2 g/ml, and (5) a pH in the form of an aqueous suspension of from 6 to 10, said amorphous definite particles being obtained by acid-treating and then heat-treating a Pc zeolite having a spherical particle shape, a notched surface and a molar ratio $SiO_2/Al_2O_3$ of from 2 to 3.4 on the basis of oxides and said amorphous definite particles further having substantially the same particulate structure as that of said Pc zeolite.

According to the present invention, furthermore, there is provided a process for preparing amorphous definite particles comprising a step of acid-treating a Pc zeolite having a spherical particle shape, a notched surface and a molar ratio $SiO_2/Al_2O_3$ of from 2 to 3.4 on the basis of oxides under the conditions where at least a part of sodium in the zeolite is removed and the molar ratio $SiO_2/Al_2O_3$ becomes from 2.1 to 3.3 on the basis of oxides, and a step of calcining the acid-treated product, so that said Pc zeolite is turned into amorphous zeolite.

According to the present invention, furthermore, there is provided an olefin resin composition comprising 100 parts by weight of an olefin resin, and, as an inorganic additive, from 0.01 to 10 parts by weight of amorphous definite particles having (1) a molar ratio $SiO_2/Al_2O_3$ of from 2.1 to 3.3 on the basis of oxides, (2) an average particle diameter of from 0.3 to 10 μm, (3) a moisture regain at equilibrium (RH90%) of not greater than 10%, (4) a bulk density of from 0.5 to 1.2 g/ml, and (5) a pH in the form of an aqueous suspension of from 6 to 10, said amorphous definite particles being obtained by acid-treating and then heat-treating a Pc zeolite having a spherical particle shape, a notched surface and a molar ratio $SiO_2/Al_2O_3$ of from 2 to 3.4 on the basis of oxides and said amorphous definite particles further having substantially the same particulate structure as that of said Pc zeolite.

According to the present invention, there is further provided an agricultural film comprising 100 parts by weight of a resin containing an olefin resin obtained by using a metallocene catalyst, as an inorganic additive from 0.01 to 10 parts by weight, as an inorganic blending agent, of amorphous definite particles having (1) a molar ratio $SiO_2/Al_2O_3$ of from 2.1 to 3.3 on the basis of oxides, (2) an average particle diameter of from 0.3 to 10 μm, (3) a moisture regain at equilibrium (RH90%) of not greater than 10%, (4) a bulk density of from 0.5 to 1.2 g/ml, and (5) a pH in the form of an aqueous suspension of from 6 to 9, said amorphous definite particles being obtained by acid-treating and then heat-treating a Pc zeolite having a spherical particle shape, a notched surface and a molar ratio $SiO_2/Al_2O_3$ of from 2 to 3.4 on the basis of oxides, and said amorphous definite particles further having substantially the same particulate structure as that of said Pc zeolite, and from 0.01 to 10 parts by weight of a lithium-aluminum composite hydroxide carbonate having a particle diameter of from 0.2 to 10 μm as measured by the laser scattering diffraction method.

In the additive (blending agent) for resins according to the present invention, it is desired that:

1. the blending agent has a molar ratio $SiO_2/Al_2O_3$ of from 2.1 to 3.3 on the basis of oxides;
2. the blending agent has a pH in the form of an aqueous suspension of from 6 to 10;
3. the definite particles are substantially spherical particles having a BET specific surface area of not greater than 50 $m^2/g$; and
4. said definite particles are obtained by acid-treating and then calcining spherical Pc zeolite having a notched surface and a molar ratio $SiO_2/Al_2O_3$ of from 2.1 to 3.3 on the basis of oxides, said amorphous definite particles further having substantially the same particulate structure as that of said Pc zeolite.

The blending agent of the present invention can be extensively used for olefin resins in general, and distinguished effects are accomplished particularly when the blending agent is used for the olefin resins obtained by using a metallocene catalyst and, most desirably, when the blending agent is used for an ethylene-α-olefin copolymer.

DESCRIPTION OF THE PREFERRED EMBODIMENT

Figure 1:
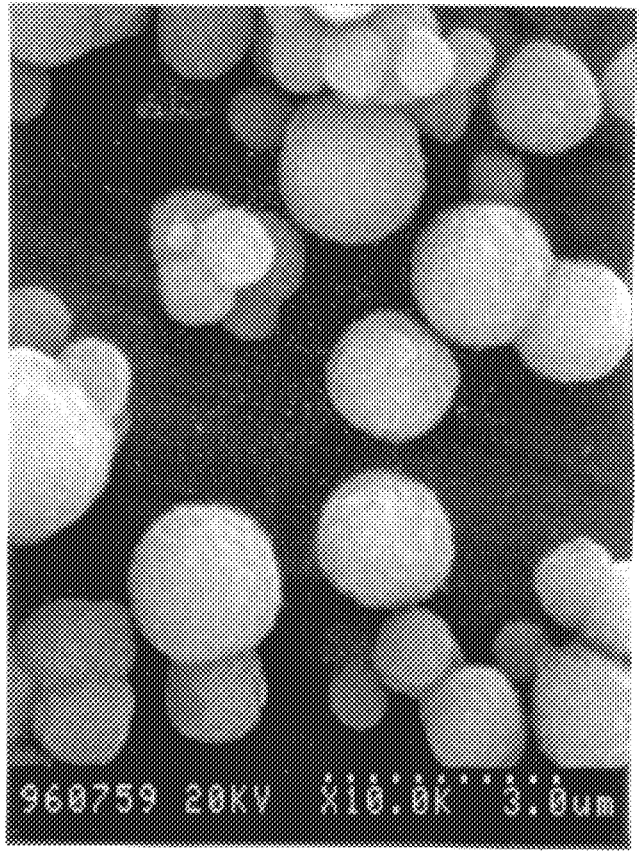
FIG. 1 is a scanning-type electron microphotograph showing particulate structure of Pc-type spherical zeolite particles (sample No. 1-1) according to the present invention.

According to the present invention, a distinguished feature resides in that the blending agent for resins comprises amorphous definite particles having a particulate shape specific to the Pc-type zeolite yet having a molar ratio $SiO_2/Al_2O_3$ of from 2.1 to 3.3, i.e., having a relatively large amount of alumina component with respect to the silica component.

That is, the silica component is acidic whereas the alumina component is basic. According to the present invention, however, the molar ratio $SiO_2/Al_2O_3$ is maintained to lie within the above-mentioned particular range, so that the pH of the aqueous dispersion is maintained to be from 6 to 10 and, particularly, from 6 to 9 and, more specifically, in the neutral region of from 6.5 to 8 when the blending agent is to be used for the films synthesized by using a metallocene catalyst, in order to eliminate disadvantage that stems when the blending agent is deviated toward either the acidic side or the alkaline side.

The silica-alumina particles and, particularly, silica-alumina particles obtained by treating zeolite with an acid, tend to exhibit an increased moisture regain at equilibrium (RH90%) with a decrease in the amount of the alumina component. According to the present invention, however, the molar ratio $SiO_2/Al_2O_3$ is controlled to lie within the above-mentioned particular range, in order to suppress the moisture regain at equilibrium (RH90%) to be not larger than 10% thereby to eliminate the problem such as foaming when being blended into a resin.

As disclosed in the above-mentioned (Japanese Patent Publication No. 42367/1993 (Japanese Laid-Open Patent Publication No. 182212/1988), the conventional amorphous silica or silica-alumina obtained by treating the Pc-type zeolite with an acid has a composition of 60 to 99.99% by weight of $SiO_2$, 0 to 25% by weight of $Al_2O_3$ and 0 to 12% by weight of $Na_2O$, and a molar ratio $SiO_2/Al_2O_3$ of not smaller than 4.08. According to an embodiment disclosed therein, furthermore, the Pc-type zeolite that is a starting material has a molar ratio $SiO_2/Al_2O_3$ of 3.78 to 7. This is because, the Pc-type zeolite tends to be formed with an increase in the molar ratio $SiO_2/Al_2O_3$ and besides, even in a step of treating the zeolite with an acid, it is easy to maintain the shape of the Pc-type zeolite.

In the synthesis of Pc-type zeolite having the molar ratio $SiO_2/Al_2O_3$ of as small as from 2 to 3.4, the A-type zeolite and X-type zeolite tend to be mixed (see Comparative Examples appearing later). However, the present inventors have discovered the facts that the Pc-type zeolite having a molar ratio $SiO_2/Al_2O_3$ of as low as from 2 to 3.4 can be synthesized through a step of reacting the sodium silicate solution with the sodium aluminate solution and then a step of vigorously stirring the formed alumino-silicate gel at a temperature of not lower than 80° C., and that the Pc-type zeolite having such a low molar ratio can be turned into amorphous form based upon the combination of the treatment with an acid that is effected to such a slight degree as to remove at least part of the sodium component and the calcining, and have thus arrived at the present invention. They have also discovered that, in the case that the molar ratio $SiO_2/Al_2O_3$ is low, a step of reacting the sodium silicate solution with the sodium aluminate solution at a temperature of not lower than 80° C. and/or maintaining the temperature at 80° C. immediately after the reacting, and a step of vigorously and continuously stirring the formed alumino-silicate gel at a temperature of not lower than 80° C., are effective. This point will now be described. The Pc-type zeolite having a relatively small silica/alumina molar ratio is treated with an acid to a slight degree, i.e., is treated with an acid to such a degree that the acid-treated product is not yet perfectly turned into amorphous form, and the acid-treated product is further calcined so that the product is turned into a completely amorphous form.

That is, the Pc-type zeolite could not, so far, be turned into amorphous form unless the alumina component in the zeolite was removed to a considerable degree. According to the present invention, however, the Pc-type zeolite can be turned into amorphous form without almost changing the $SiO_2/Al_2O_3$ molar ratio, giving such advantages that the particles have a dense structure, offer a bulk density of as high as from 0.5 to 1.2 g/ml, exhibit a decreased hygroscopic tendency, a pH which is close to neutral, a high yield, without causing the particles to be collapsed or the particles to be coagulated together, and exhibiting definite shape and uniform size.

The additive (blending agent) for resins of the present invention must have a particulate shape specific to the Pc-type zeolite and an average particle diameter of from 0.3 to 10 $\mu$m. When the particle diameter is smaller than the above range, the particles coagulate together or lose definite shape, which is not desirable. When the particle diameter is greater than the above range, on the other hand, zeolites other than the Pc-type one tends to be mixed (due to starting zeolite), which is not desirable.

[Amorphous Definite Particles]

Figure 2:
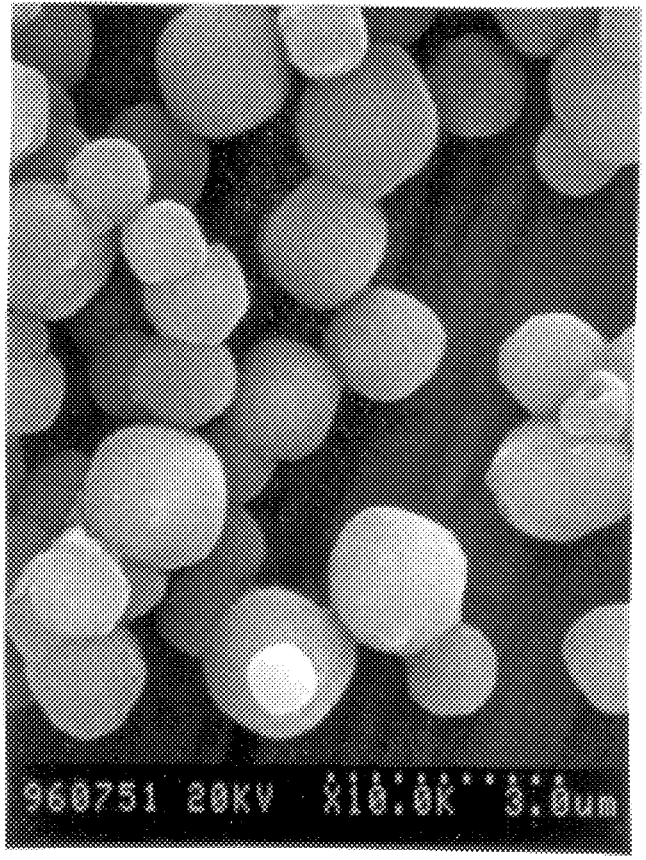
FIG. 2 is a scanning-type electron microphotograph showing particulate structure of spherical lowly hygroscopic amorphous silica-alumina particles (sample No. 1-3) according to the present invention.
Figure 3:
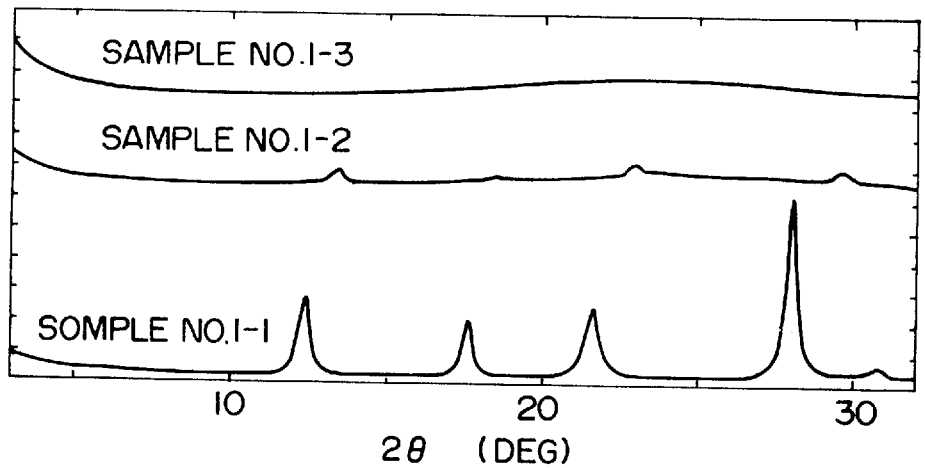
FIG. 3 is a diagram of X-ray diffraction of samples Nos. 1-1, 1-2 and 1-3 of the Pc-type zeolite of the present invention obtained in Example 1 and of the acid-treated products thereof.
Figure 4:
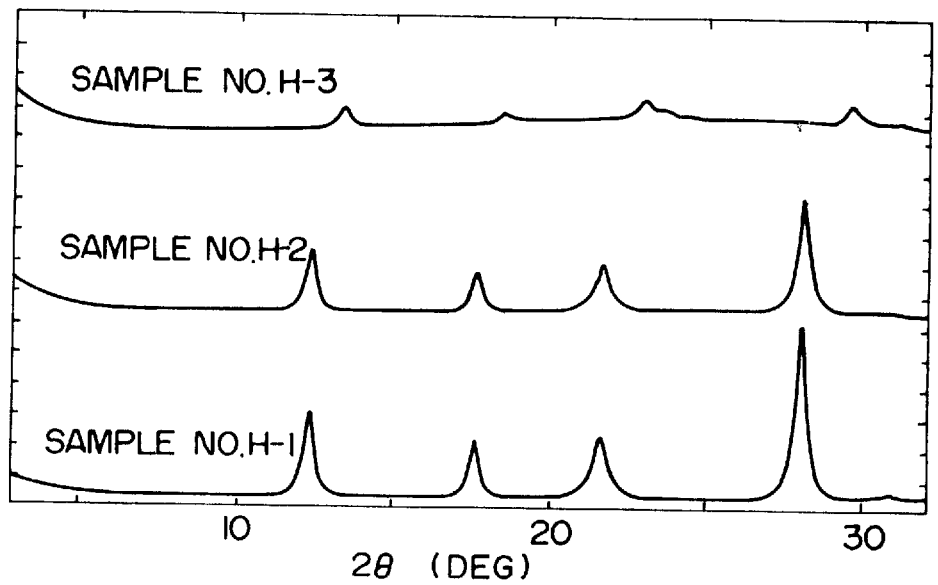
FIG. 4 is a diagram of X-ray diffraction of samples Nos. H-1, H-2 and H-3 of the Pc-type zeolite obtained in Comparative Example 1 and of the acid-treated products thereof.

FIG. 1 is a scanning-type electron microphotograph showing particulate structure of Pc-type spherical zeolite particles (sample No. 1-1) according to the present invention, FIG. 2 is a scanning-type electron microphotograph showing particulate structure of spherical lowly hygroscopic amorphous silica-alumina particles (sample No. 1-3) according to the present invention, FIG. 3 is a diagram of X-ray diffraction of samples Nos. 1-1, 1-2 and 1-3 of the Pc-type zeolite of the present invention obtained in Example 1 that will be described later and of the acid-treated products thereof, and FIG. 4 is a diagram of X-ray diffraction of samples Nos. H-1, H-2 and H-3 of the Pc-type zeolite obtained in Comparative Example 1 and of the acid-treated products thereof.

From FIGS. 1 to 4, it will be understood that the amorphous definite particles of the present invention are turned into amorphous form while substantially maintaining the particulate shape and particle diameter of the Pc-type zeolite.

Figure 9:
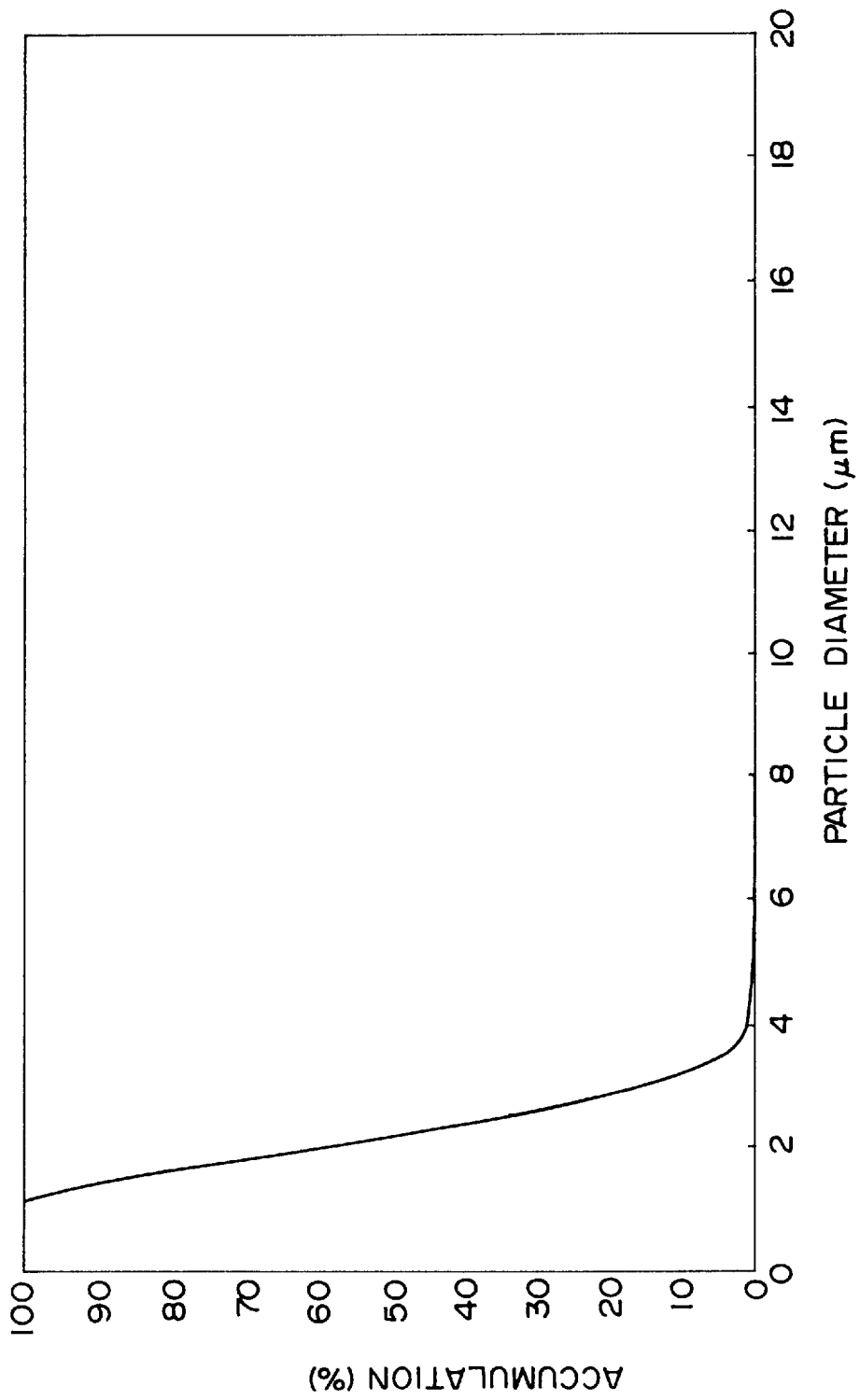
FIG. 9 is a diagram of a curve representing volume basis particle size distribution of the amorphous definite particles of the present invention.
Figure 10:
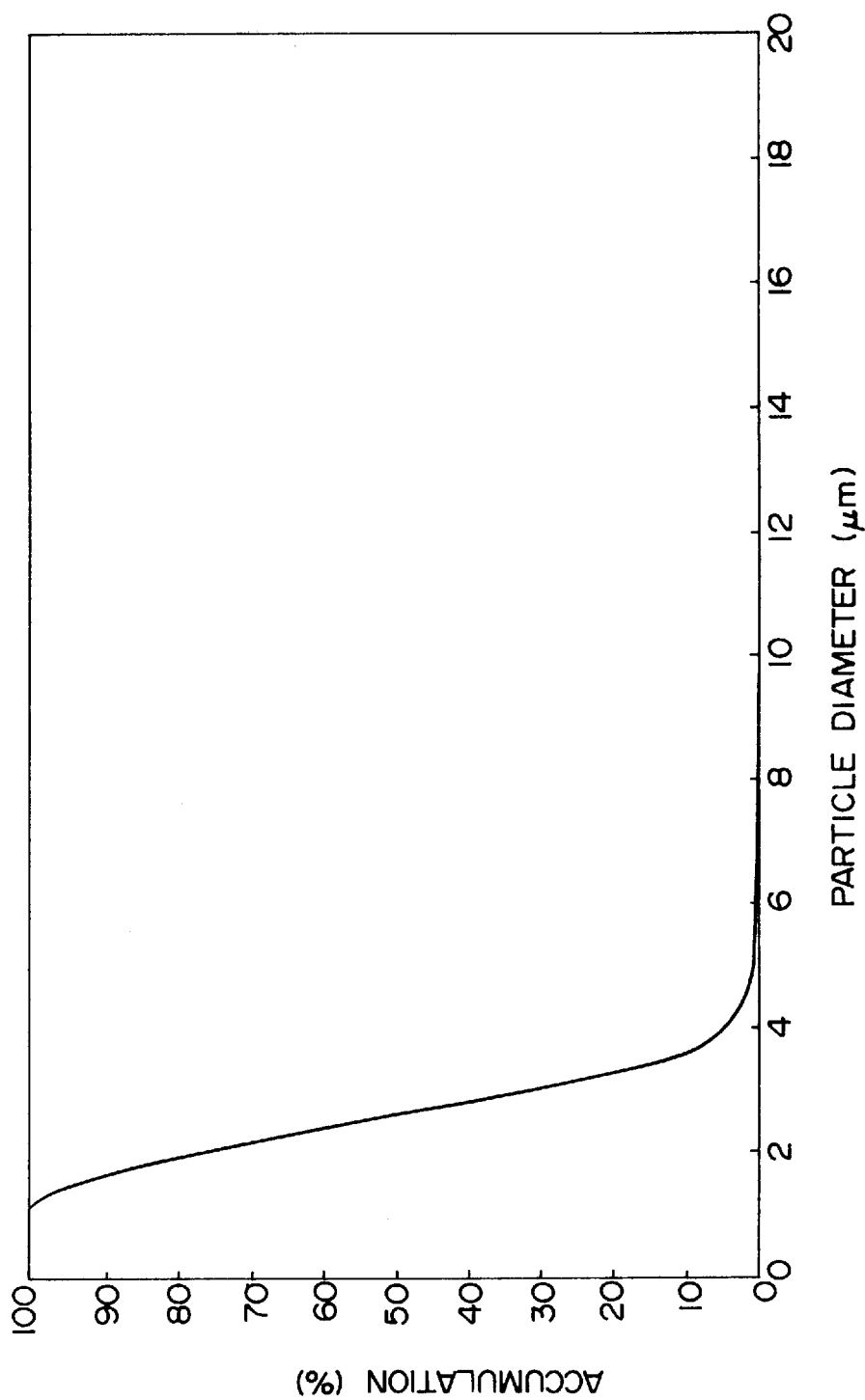
FIG. 10 is a diagram of a curve representing volume basis particle size distribution of the other amorphous definite particles of the present invention.

The amorphous definite particles of the present invention have an average particle diameter over a range of from 0.3 to 10 $\mu$m and a very sharp particle size distribution. The particle size distribution is usually found on the volume basis by using the Coulter counter and can be expressed in a variety of forms. In general, however, the particle size distribution is expressed as a ratio of the particle diameter (D25) for the integrated value 25% from the large diameter side and the particle diameter (D75) for the integrated value 75%. The value D25/D75 of the porosity-controlled amorphous silica definite particles used for the present invention is, usually, not larger than 1.7. FIGS. 9 and 10 show curves representing particle size distributions of amorphous definite particles of the present invention.

Another feature of the present invention is that the amorphous definite particles have a BET specific surface area that is suppressed to be from 10 to 50 $m^2/g$. By suppressing the specific surface area to be not larger than 50 $m^2/g$, the bulk density is increased to lie over a range as described above, the blending agent can be favorably blended and dispersed in the resin, and can be transited and stored in a compact form. Besides, the hygroscopic tendency of the amorphous definite particles, that is liable to increase, is suppressed, so that the particles will not absorb moisture before they are blended, thereby to prevent foaming at the time of blending or molding.

[Preparation of Amorphous Definite Particles]

According to the present invention, the starting Pc-type zeolite having a molar ratio $SiO_2/Al_2O_3$ of as small as from 2 to 3.4 is synthesized. A preferred Pc-type zeolite will have the following composition:

| | |
|---|---|
| $SiO_2$ | 50 to 40% by weight |
| $Al_2O_3$ | 23 to 35% by weight |
| $Na_2O$ | 15 to 19% by weight |

To prepare the Pc-type zeolite, sodium silicate or active silicic acid gel, sodium aluminate and sodium hydroxide are mixed together to satisfy the following conditions:

| Component ratio | Molar ratio | Preferred molar ratio |
|---|---|---|
| $Na_2O/SiO_2$ | 0.2 to 8 | 0.5 to 2 |
| $SiO_2/Al_2O_3$ | 2 to 3.7 | 2.5 to 3.1 |
| $H_2O/Na_2O$ | 20 to 200 | 30 to 100 | in order to form a gel of alumino-silicate alkali. In order to prevent the formation of by-products of A-type zeolite and X-type zeolite, it is important to effect the crystallization under homogeneous conditions by conducting the reaction at a temperature of as high as not lower than 80° C. and, particularly, at a temperature of from 80° to 200° C. with vigorous stirring under normal pressure or under hydrothermal condition. Thus, the Pc zeolite is synthesized in a pure form. The formed zeolite is washed with water, classified into a predetermined particle size as desired, and is treated with an acid.

According to the present invention, the spherical Pc-type zeolite obtained according to the above-mentioned method is turned into an amorphous form based upon the combination of a step of treatment with an acid under a condition where at least a part of the sodium component is removed from the zeolite and a step of calcining the acid-treated product.

Any acid can be used without any particular limitation irrespective of if it is an inorganic acid or an organic acid. From the economical viewpoint, however, use is made of such an acid as hydrochloric acid, sulfuric acid, nitric acid or phosphoric acid. These acids are used in the form of a dilute aqueous solution for the neutralization reaction with the crystalline zeolite.

It is desired that the treatment with an acid is effected to such an extent that the Pc-type zeolite is turned to be amorphous to some extent but not to a complete degree. In particular, the treatment with an acid should not be effected to such an extent that the alumina component is eluted out. When the height of a maximum peak of the Pc-type zeolite is denoted by H in the X-ray diffraction diagram and the height of a peak of the acid-treated product is denoted by h, then, the treatment with an acid is effected such that the ratio h/H is from 0.01 to 0.35 and, preferably, from 0.05 to 0.25 and, particularly preferably, from 0.05 to 0.18. When an acid is added to an aqueous slurry of the crystalline zeolite, the pH shifts toward the acidic side with the addition of acid, as a matter of course. After the addition is terminated, however, the pH of the solution moves again toward the alkaline side and tends to be saturated at a predetermined pH value. It is desired to so neutralize the system that the saturated pH or the stabilized pH lies over a range of from 1.5 to 6 and, particularly, from 2 to 4 from the standpoint of turning the zeolite into amorphous form without impairing the particulate shape yet minimizing the amount of elution in the zeolite.

The alumina-silica particles obtained by eluting and removing at least a part of the alkali component by the treatment with an acid, are filtered, washed with water as required, dried and is calcined thereby to obtain amorphous definite particles.

The thus obtained amorphous definite particles are usually calcined at a temperature of from 300° to 130° C. to promote the process for turning the particles into amorphous form and to contract the inner pores. That is, even when the treatment with an acid is not sufficient for turning the Pc-type zeolite into amorphous form, the calcining further promotes the process for turning the Pc-type zeolite into amorphous form. Thus, the completely amorphous zeolite particles are obtained. Therefore, the concrete conditions for the calcining are such that the Pc-type zeolite particles are completely turned into amorphous form and that the amorphous definite particles possess the aforementioned properties. The calcining conditions should not damage the particulate shape as a matter of course.

In general, the Pc-type zeolite is more turned into amorphous form with an increase in the calcining temperature, and the shrinking degree of the pores increases with an increase in the calcining temperature or with an increase in the calcining time when the temperature remains the same. Even when the particle diameter is the same, the refractive index of the particles can be adjusted by changing the calcining temperature. For example, when the particles of Example 3 appearing later are calcined, the calcined product exhibits a refractive index of 1.481 when it is fired at 550° C. for 30 minutes, exhibits a refractive index of 1.485 when it is calcined at 700° C. for 30 minutes, exhibits a refractive index of 1.489 when it is calcined at 800° C. for 30 minutes, and exhibits a refractive index of 1.50 when it is calcined at 900° C. for 30 minutes. The refractive index can be increased to be not smaller than 1.5 by further elevating the calcining temperature. Thus, the calcining conditions are determined based upon the degree of turning the acid-treated product into amorphous form, or upon the specific surface area and porous volume possessed by the acid-treated product, desired moisture regain at equilibrium (RH90%) and refractive index.

The calcining can be effected by using a calcining furnace of the rotary type, fixed bed type, moving bed type or fluidized bed type, and the source of heat may utilize a combustible gas, infrared rays or electric heating to heat the system from the inside or from the outside. The calcining time is usually from about 0.1 to about 3 hours.

Though generally not necessary, at least one of a metal component selected from the group consisting of alkali metal, alkaline earth metal, Ti, Zr, Al and Zn may, as required, be added to the acid-treated product prior to the calcining, in order to improve the surfaces of the formed amorphous definite particles. Relying upon the surface improvement, furthermore, the refractive index of the product of the present invention can be adjusted to be from 1.46 to 1.55, and the product can be blended to meet the refractive index of the resin.

It is desired that the alkali metal component, alkaline earth metal or any other metal component is used in such an amount that will not impair the hygroscopic property, and is usually used in an amount of not larger than 15% by weight and, particularly, from 0.5 to 10% by weight based on the oxides with respect to the acid-treated definite particles.

As the alkali metal, alkaline earth metal, Ti, Zr, Al or Zn component, use is made of an oxide, a hydroxide or water-soluble salts. Concrete examples include sodium hydroxide, potassium hydroxide, calcium hydroxide, magnesium hydroxide, aluminum hydroxide, titanium nitrate, titanium chloride, zirconium chloride, aluminum nitrate, aluminum chloride, sodium aluminate, zinc flower and zinc nitrate. When the water-soluble salts are used, it is desired that the residual anions are removed by washing with water. It is particularly desired to use a hydroxide of an alkali metal or alkaline earth metal. For example, to the 20%-slurry of the product of the invention is added aluminum sulfate (8.18% of $Al_2O_3$, 18.8% of $SO_3$) in an amount reckoned to be from 3 to 10% ($Al_2O_3$) with respect to the solid components, followed by stirring. Thereafter, 12.5% of ammonia water is dropwisely added thereto, the pH is raised to about 7, and the mixture is stirred for 10 hours, and is filtered and washed. Here, the dry cake may be calcining at 550° C. to 700° C. to prepare aluminum-added amorphous and spherical silica-alumina particles to adjust the refractive index to be not smaller than 1.48.

The amorphous definite particles used in the present invention may be coated or treated on their surfaces with an inorganic oxide such as titanium oxide, silicon oxide, zirconium oxide, zinc oxide, barium oxide, magnesium oxide or calcium oxide; or a coupling agent of the type of silane, titanium or zirconium. As required, furthermore, the particles may be blended with a metal soap, a resin acid soap, various resins or waxes, silane-type or titanium-type coupling agent, oxides or hydroxides of various metals, or may be coated with silica. It is further allowable to blend the amorphous and spherical silica-alumina particles of the present invention with indefinite silica (silica sol, fumed silica, wet-method silica) finer than the amorphous and spherical silica-alumina particles in an amount of not smaller than 0.2% by weight and, preferably, in an amount of from 0.3 to 5% by weight with respect to the amorphous and spherical silica-alumina particles, in order to improve dispersion property of the amorphous and spherical silica-alumina particles.

Examples of the silane-type coupling agent include amino silanes such as γ-aminopropyltriethoxysilane, N-β (aminoethyl) γ-aminopropyltrimethoxysilane, N-phenyl-γ-aminopropyltrimethoxysilane, and N-β (aminoethyl) γ-aminopropylmethyldimethoxysilane; methacryloxy silanes such as γ-methacryloxypropyltrimethoxysilane and the like; vinyl silanes such as vinyl tris(β-methoxyethoxy)

silane, vinyl triethoxysilane, vinyl trimethoxysilane, vinyl trichlorosilane and the like; epoxy silanes such as β-(3,4-epoxycyclohexyl)ethyltrimethoxysilane, γ-glycidoxypropyltrimethoxysilane, γ-glycidoxypropylmethyldiethoxysilane and the like; mercapto silanes such as γ-mercaptopropyltrimethoxysilane and the like; and chloropropyl silanes such as γ-chloropropyltrimethoxysilane.

Examples of the titanate-type coupling agent include isopropyltriisostearoyl titanate, isopropyltridodecylbenzenesulfonyl titanate, isopropyltris(dioctylpyrophosphate) titanate, tetraoctylbis(ditridecylphosphite) titanate, tetra(2,2-diaryloxymethyl-1-butyl)bis(di-tridecyl)phosphite titanate, bis(dioctylpyrophosphate)oxyacetate titanate, bis(dioctylpyrophosphate)ethylene titanate, isopropyltrioctanoyl titanate, isopropyldimethacrylisostearoyl titanate, isopropylisostearoyldiacryl titanate, isopropyltri(dioctylphosphate) titanate, isopropyltricumylphenyl titanate, isopropyltri(N-aminoethyl-aminoethyl) titanate, dicumylphenyloxyacetate titanate, diisostearoylethylene titanate, polydiisopropyl titanate, tetranormalbutyl titanate, and polydinormalbutyl titanate.

It is desired that the surfactant is used generally in an amount of from 0.1 to 10% by weight with respect to the amorphous definite particles though the amount may vary depending upon its kind.

[Use]

The amorphous definite particles of the present invention can be used for all applications where the amorphous silica-alumina definite particles have heretofore been used.

The amorphous definite particles are particularly useful as a blending agent for thermoplastic resins, thermosetting resins and various rubbers. The amorphous definite particles can be further used for carriers for catalysts, base materials for cosmetics, delustering agents for coating materials, toner additives and polishing materials.

The amorphous definite particles exhibit a moisture regain at equilibrium which is suppressed to lie within a low range under high-humidity conditions, and absorb little moisture and are not foamed. Besides, the amorphous definite particles have a pH which is neutral or close to neutral, and do not develop such inconvenience as coloring caused by adsorption by other additives or do not cause properties of other additives to be deteriorated. Thus, the amorphous definite particles serve as an excellent blending agent for the resin films and, particularly, serve as an antiblocking agent.

Examples of the thermoplastic resin to which the amorphous definite particle is used as the antiblocking agent include olefin resins, such as low-, medium- or high-density polyethylene, isotactic polypropylene, syndiotactic polypropylene, or a polypropylene polymer which is a copolymer thereof with an ethylene or an α-olefin, linear low-density polyethylene, ethylene-propylene copolymer, polybutene-1, ethylene-butene-1 copolymer, propylene-butene-1 copolymer, ethylene-propylene-butene-1 copolymer, ethylene-vinyl acetate copolymer, ionically crosslinked olefin copolymer (ionomer), and ethylene-acrylic ester copolymer, which may be used alone or in the form of a blend of two or more kinds.

The olefin polymers may be either those obtained by using a so-called Ziegler catalyst which comprises a halogen-containing transition metal compound and an organoaluminum compound or those obtained by using a so-called metallocene catalyst, i.e., a catalyst comprising an organic aluminoxane compound and a complex containing a cyclopentadienyl skeleton of a transition metal such as titanium or zirconium.

The olefin resin produced by using a metallocene catalyst exhibits excellent mechanical strength, transparency, heat-sealing strength and extraction resistance, and is suited as a packaging material. The amorphous definite particles of the present invention are particularly useful as an antiblocking agent for the olefin resin film produced by using the metallocene catalyst, eliminating the coloring tendency that is exhibited by the conventional antiblocking agents. When the amorphous and spherical silica-alumina particles of the present invention are to be used for the films produced by using the metallocene catalyst, it is desired that the pH of the particles in the form of an aqueous suspension is from 6 to 9 and, preferably, from 6.5 to 8.

Among the above-mentioned olefin polymers to which the amorphous definite particle is used as blending agents for the resins of the present invention, a linear low-density polyethylene (LLDPE) obtained by copolymerizing an ethylene and an α-olefin having 3 to 18 carbon atoms, such as propylene, butene-1, pentene-1, hexene-1, 4-methylpentene-1, heptene-1, octene-1, or decene-1 in the presence of a transition metal catalyst and, particularly, metallocene catalyst, is desired. In order to improve the moldability of the LLDPE, furthermore, it has been known to form a film by blending the LLDPE with a low-density polyethylene or a high-density polyethylene. The blending agent of the present invention can be used even for this resin composition.

The blending agent for resins of the present invention is also utilizable as an antiblocking agent for the improved propylene polymer composition. That is, in order to improve shock resistance and softness of the crystalline propylene polymer, the crystalline propylene polymers such as homopolypropylene, ethylene-propylene random copolymer and ethylene-propylene block copolymer have been blended with an ethylene-α-olefin copolymer elastomer and, particularly, with an ethylene-α-olefin copolymer obtained by using the metallocene catalyst. The blending agent for resins of the present invention is also utilizable as an antiblocking agent for the propylene polymer compositions.

In the olefin resin composition of the present invention, it is desired to use the amorphous definite particles in an amount of from 0.01 to 50 parts by weight per 100 parts by weight of the olefin resin. As the AB agent, in particular, the amorphous definite particles are used in an amount of from 0.1 to 3 parts by weight for the polyethylene film and in an amount of from 0.01 to 0.3 parts by weight for the polypropylene film. As the master batch, furthermore, the amorphous definite particles are used in an amount of from 1 to 50 parts by weight. When the amount of blending the definite particles is smaller than the above-mentioned range, it becomes difficult to prevent the blocking of the film and to improve the handling of the film. Even when the amorphous definite particles are blended in amounts larger than the above-mentioned range, no particular advantage is obtained but the friction on the surface tends to increase, which is not desirable.

As required, the olefin resin composition is blended with an antioxidizing agent, a heat stabilizer, a light stabilizer, a lubricating agent, an antistatic agent, a defogging agent, a neutralizer (halogen catcher), a nucleating agent and a heat ray absorbing agent. The blending agent for resins of the present invention may be neutral and is inert against other blending agents for resins, does not decompose or color them, does not impair properties of other blending agents for resins, and does not deteriorate properties of the resins.

The antioxidizing agent will be a phenolic antioxidizing agent, such as 2,6-di-t-butyl-4-methylphenol, tris(3,5-di-t- butyl-4-hydroxybenzyl)isocyanulate (Irganox 3114 manufactured by Chiba Geigy Co.), 2,2'-methylenebis(4-ethyl-6-t-butylphenol), n-octadecyl-3-(3',5'-di-t-butyl-4'-hydroxyphenyl)propionate (Irganox 1076 manufactured by Chiba Geigy Co.), 4,4'-thiobis(3-methyl-6-t-butylphenol), tetrakis[methylene-3-(3',5'-di-t-butyl-4'-hydroxyphenyl) propionate]methane (Irganox 1010 manufactured by Chiba Geigy Co.), 4,4'-butylidenebis(3-methyl-6-t-butylphenol), 2,2'-methylenebis(4-methyl-6-t-butylphenol), N,N'-hexamethylenebis(3,5-di-t-butyl-4-hydroxyhydrocinnamide) (Irganox 1098 manufactured by Chiba Geigy Co.), triethyleneglycolbis[3-(3'-t-butyl-5'-methyl-4-hydroxyphenyl)propionate], and a mixture of bis (3,5-di-t-butyl-4-hydroxybenzyl ethylphosphonate) and PE wax (weight ratio of 1:1).

It is desired to use the phenolic antioxidizing agent in an amount of from 0.01 to 0.3 parts by weight. When the amount is smaller than the above-mentioned range, the antioxidizing effect is not exhibited. When the amount is larger than 0.3 parts by weight, on the other hand, the resin turns into yellow after preserved for extended periods of time or bleeding occurs on the film surface to lose transparency or to deteriorate antiblocking property.

Examples of the phosphorus-type antioxidizing agent include trimethyl phosphite, tri-n-butyl phosphite, tridecyl phosphite, tris(2-ethylhexyl) phosphite, trinonyl phosphite, tricetyl phosphite, dilaurylhydrogen phosphite, tricyclohexyl phosphite, triphenyl phosphite, tribenzyl phosphite, tricresyl phosphite, tri-p-nonylphenyl phosphite, diphenyldecyl phosphite, tris(dinonylphenyl) phosphite, tris(2,4-di-t-butylphenyl) phosphite, tris(4-α-methylbenzylphenyl) phosphite, tris(octylthioethyl) phosphite, tris (octylthiopropyl) phosphite, tris(cresylthiopropyl) phosphite, tris(3,5-di-t-butyl-4-hydroxyphenyl) phosphite, tetraphenyldipropyleneglycol diphosphite, 4,4'-butylidenebis(3-methyl-6-t-butylphenylditridecyl) phosphite, 1,1,3-tris(2-methyl-4-ditridecylphosphite-5-t-butylphenyl) butane, bis(2-chloropropyl) pentaerithritol diphosphite, bisphenylpentaerithritol diphosphite, bisstearylpentaerithritol diphosphite, trilauryltrithio phosphite, tetrakis(2,4-di-t-butylphenyl)-4,4'-biphenylene diphosphite, etc.

It is desired that the phosphorus-type antioxidizing agent (c) is added in an amount of from 0.01 to 0.2 parts by weight. When the amount is smaller than the above range, the antioxidizing effect is not obtained and the effect is not exhibited, either, for preventing the resin from turning into yellow. When the amount exceeds 0.3 parts by weight, on the other hand, a consideration of black specks or metal corrosion tends to be increased.

As the heat stabilizer, use is made of phosphite, phosphonite or a phosphonic acid derivative.

Here, a variety of phosphites can be exemplified such as triphenyl phosphite, diphenyl phosphite, didecylphenyl phosphite, tridecyl phosphite, trioctyl phosphite, tridodecyl phosphite, trioctadecyl phosphite, trinonylphenyl phosphite, tridodecyltrithio phosphite, distearylpentaerithritol diphosphite, 4,4'-buthylidenebis(3-methyl-6-t-butylphenylditridecyl) phosphite, tris(2,4-di-t-butylphenyl) phosphite, bis(2,4-di-t-butylphenyl) pentaerithritol diphosphite, as well as 4,4'-isopropylidenediphenyltetraalkyl diphosphite having an alkyl group with 12 to 15 carbon atoms.

As the phosphonite, there can be exemplified tetrakis(2, 4-dialkylphenyl)-4,4'-biphenylene diphosphonite, etc. Here, the alkyl group has 1 to 30 carbon atoms. Among them, it is particularly desired to use a tetrakis(2,4-di-t-butylphenyl)-4,4'-biphenylene diphosphonite.

Examples of the phosphonic acid derivative include 4-hydroxy-3,5-di-t-butylbenzylphosphonic acid, o-ethyl-(4-hydroxy-3,5-di-t-butylbenzyl)phosphonic acid, o-(2-ethylhexyl)-(4-hydroxy-3,5-di-t-butylbenzyl)phosphonicacid, o-ethyl(4-hydroxy-3,5-di-ti-butylbenzyl)phosphonic acid, and calcium salt of o-ethyl-(4-hydroxy-3,5-t-butylbenzyl)phosphonic acid.

It is desired that the heat stabilizer is blended in an amount of from 0.01 to 1.0 parts by weight per 100 parts by weight of the resin.

As the light stabilizer, use is made of an ultraviolet ray-absorbing agent or an ultraviolet ray stabilizer.

As the ultraviolet ray-absorbing agent, there can be exemplified benzotriazole-type ultraviolet ray-absorbing agents such as 2-(5-methyl-2-hydroxyphenyl)benzotriazole, a known chemical substance No. (5)-544; 2-[2-hydroxy-3,5-bis(a,a-dimethylbenzyl)phenyl]-2H-benzotriazole, a known chemical substance No. (5)-5459; 2-(3,5-di-t-butyl-2-hydroxyphenyl)benzotriazole, a known chemical substance No. (5)-3580; 2-(3-t-butyl-5-methyl-2-hydroxyphenyl)-5-chlorobenzotriazole, a known chemical substance No. (5)-545; 2-(3,5-di-t-butyl-2-hydroxyphenyl)-5-chlorobenzotriazole, a known chemical substance No. (5)-3605; 2-(3,5-di-t-amyl-2-hydroxyphenyl)benzotriazole, a known chemical substance No. (5)-3604; and oxalic acid anilide-type ultraviolet ray-absorbing agent such as 2-ethoxy-2'-ethyloxalic acid bisanilide, a known chemical substance No. (3)-2830, and 2-ethoxy-5-t-butyl-2'-ethyloxalic acid bisanilide, a known chemical substance No. (3)-2800.

As the ultraviolet ray stabilizer, there can be exemplified those of the hindered amine type, such as dimethyl-1-(2-hydroxyethyl)-4-hydroxy-2,2,6,6-tetramethylpiperidine succinate polycondensation product, a known chemical substance No. (7)-2132; poly[[6-(1,1,3,3-tetramethylbutyl) imino-1,3,5-triazine-2,4-diyl][(2,2,6,6-tetramethyl-4-piperidyl)-imino]hexamethylene[[2,2,6,6-tetramethyl-4-piperidyl)imino]], a known chemical substance No. (7)-2170; and 2-(3,5-di-t-butyl-4-hydroxybenzyl)-2-n-butylmalonic acid bis(1,2,2,6,6-pentamethyl-4-piperidyl), a known chemical substance No. (5)-5413.

It is desired that these light stabilizers are used in an amount of from 0.01 to 1 part by weight per 100 parts by weight of the resin.

As the lubricating agent used for improving the workability of the resin composition, there can be used any lubricating agent that is used for the polyolefin films. That is, the lubricating agent may be (a) those of the hydrocarbon type, such as fluidizing, natural or synthetic paraffin, microwax, polyethylene wax and chlorinated polyethylene wax; (b) those of the fatty acid type such as stearic acid, lauric acid, etc.; (c) palmitic acid amide, ecilic acid amid, methylenebisstearoamid, ethylenebisstearoamide, erucic acid amide, stearic acid amide, oleic amide, behenic acid amide, N-stearylbutylic acid amide, N-stearylcapric acid amide, N-stearyllauric acid amide, N-stearylstearic acid amide, N-stearylbehenic acid amide, N-oleyloleic acid amide, N-oleylbehenic acid amide, N-butylerucic acid amide, N-octylerucic acid amide, N-laurylerucic acid amide, ethylenebisoleic acid amide, hexamethylenebisoleic amide, N,N'-dioleyladipic acid amide, N,N'-dioleylsebaccic acid amide, etc., (d) those of the ester type, such as butyl stearate, cured castor oil, ethylene glycol monostearate, etc., (e) those of the alcohol type, such as cetyl alcohol, stearyl alcohol, etc., (f) metal soaps such as lead stearate, calcium stearate, etc., and (g) a mixture system thereof. Particularly preferably, however, those of the fatty acid monoamide type or of the bisamide type are used.

It is desired that the lubricating agent and, particularly, the fatty acid amide-type lubricating agent is used in an amount of from 0.01 to 0.3 parts by weight per 100 parts by weight of the resin. When the amount is smaller than the above range, the lubricating property is not imparted. When the amount is larger than the above range, the film surface is whitened due to bleeding and the transparency is lost.

An antistatic agent may be blended in order to impart antistatic property to the resin. As the antistatic agent, there can generally be used (a) those of the cationic type, such as primary amine salt, tertiary amine, quarternary ammonium compound and pyridine derivatives; (b) those of the anionic type, such as sulphonated oil, soap, sulphonated ester oil, sulphonated amide oil, sulfuric ester salts of olefin, sulfuric ester salts of fatty alcohol, alkylsulfuric ester salts, fatty acid ethyl sulfonate salts, alkylnaphthalene sulfonate salts, alkylbenzene sulfonate salts, succinic ester sulfonate salts, and phosphoric ester salts; (c) those of the nonionic type, such as partial ester of fatty acid of polyhydric alcohol, ethylene oxide adduct of fatty alcohol, ethylene oxide adduct of fatty acid, ethylene oxide adduct of fatty amino or fatty acid amide, ethylene oxide adduct of alkylphenol, ethylene oxide adduct of alkylnaphthol, ethylene oxide adduct of partial ester of fatty acid of polyhydric alcohol, and polyethylene glycol; and (d) those of the amphoteric type, such as carboxylic acid derivatives and imidazoline derivatives. It is, however, desired to use those of the nonionic type and, particularly, polyoxyethylenealkylamine or polyoxyethylenealkylamide or fatty acid ester thereof, or fatty acid ester of glycerin.

When transparency and antifogging property are required such as for agricultural films, an antifogging agent may be blended. Examples of the antifogging agent will include stearic acid monoglyceride, oleic acid monoglyceride, polyglycerin oleic acid ester, sorbitan monolaurate, sorbitan monopalmitate, sorbitan monostearate and sorbitan monooleate.

As a neutralizing agent for trapping halogen atoms in the catalyst residue contained in the olefin resin, there can be used calcium hydroxide, magnesium hydroxide, calcium silicate, magnesium silicate, fatty acid calcium, fatty acid magnesium, hydrotalcite, and lithium-aluminum hydroxide carbonate. Among them, the lithium-aluminum hydroxide carbonate consists of fine particles of the shape of a hexagonal plate, disperses well in the resin, and is used as an excellent halogen atom-trapping agent. Examples of the lithium-aluminum hydroxide carbonate have been disclosed in Japanese Laid-Open Patent Publication No. 300313/1975.

It is desired that the neutralizing agent is used in an amount of from 0.1 to 10 parts by weight per 100 parts by weight of the resin.

As a nucleating agent for promoting the crystallization of a resin, there can be exemplified aluminum-p-tert-butyl benzoate, dibenzylidene sorbitol, sodium bis(4-tert-butylphenyl)phosphate, sodium 2,2'-methylenebis(4,6-ditert-butylphenyl)phosphate, calcium 2,2'-methylenebis(4,6-ditert-butylphenyl)phosphate, and basic aluminum 2,2'-methylenebis(4,6-ditert-butylphenyl)phosphate.

In the olefin resin composition of the present invention, the blending agent of a silica-alumina type for resins may have been blended in advance in the polymerization system in the form of a catalyst carrier or may have been blended in the olefin resin. The blending can be effected by either melt blending or dry blending. In either case, the blending agent for resin of the present invention can be blended in the form of a so-called master batch. The blending agent is kneaded together with the resin by using a roll, Bumbury's mixer or extruder.

A film is formed by a known means such as T-die method, inflation film-forming method or the like method. The film may be in the form of an undrawn film or an oriented film being monoaxially drawn or biaxially drawn. According to the present invention, the blending agent for resins have a sharp particle size distribution and a definite shape, offering excellent handling property even when the film is considerably thin. Therefore, the film can be used for various applications and, particularly, as a wrapping film in the form of a single-layer film or a laminated-layer film. Though there is no particular limitation, it is desired that the film has a thickness over a range of from 20 to 100 μm.

The olefin resin composition of the present invention can also be used as agricultural films. As the olefin resin for the agricultural films, there can be used the above-mentioned linear low-density polyethylene or the ethylene-vinyl acetate copolymer resin. In these applications, it is desired that the amorphous definite particles are blended in an amount of from 0.01 to 10 parts by weight per 100 parts by weight of the resin, and the heat ray-absorbing agent (infrared ray-absorbing agent) or the heat retaining agent is contained in an amount of from 0.01 to 10 parts by weight per 100 parts by weight of the resin. As the heat retaining agent, it is desired to use a lithium-aluminum composite hydroxide carbonate having a particle diameter of from 0.2 to 10 μm as measured by the laser scattering diffraction method. Suitable examples of the lithium-aluminum composite hydroxide carbonate have been disclosed in Japanese Laid-Open Patent Publication No. 300313/1975. The composition of the agricultural film may be blended with the above-mentioned antifogging agent in an amount of from 0.01 to 5 parts by weight per 100 parts by weight of the resin.

As required, the resin composition of the present invention may be blended with kaolin, talc, acid clay, sericite, zeolite, zeolite ionically altered with Ca, Zn, etc., sepiolite, wollastonite, nephelinesyenite, hydrotalcite, dawsonite, dolomite, silica, calcium carbonate, calcium silicate, mica, quarts and basic magnesium carbonate (light or heavy), which are inorganic fillers.

The inorganic fillers may be blended in an amount of from 0.01 to 10 parts by weight per 100 parts by weight of the resin. It is desired that the particle diameter of the inorganic fillers is from 0.1 to 10 μm.

The blending agent for resins of the present invention can be blended, as an antiblocking agent, even into other resin films that have been widely known, such as polyamides, e.g., nylon 6, nylon 6-6, nylon 6-10, nylon 11, nylon 12 and to thermoplastic polyesters like polyethylene terephthalate, polybutylene terephthalate, as well as polycarbonate, polysulfone, polystyrene, and polymer alloys thereof. The blending amount complies with the case of the olefin resins. The same holds even for the other blending agent for resins.

The amorphous definite particles of the present invention can be blended as a filler into the above-mentioned thermoplastic resins, various rubbers or into thermosetting resins.

Examples of the elastomer polymer for rubbers include nitrile-butadiene rubber (NBR), styrene-butadiene rubber (SBR), chloroprene rubber (CR), polybutadiene (BR), polyisoprene (IIB), butyl rubber, natural rubber, ethylene-propylene rubber (EPR), ethylene-propylene-diene rubber (EPDM), polyurethane, silicone rubber, acrylic rubber; and thermoplastic elastomers such as styrene-butadiene-styrene block copolymer, styrene-isoprene-styrene block copolymer, hydrogenated styrene-butadiene-styrene block copolymer, and hydrogenated styrene-isoprene-styrene block copolymer.

As the thermosetting resins, there can be exemplified phenol-formaldehyde resin, furan-formaldehyde resin, xylene-formaldehyde resin, ketone-formaldehyde resin, urea-formaldehyde resin, melamine-formaldehyde resin, alkyd resin, unsaturated polyester resin, epoxy resin, bismaleimide resin, triarylcyanurate resin, thermosetting acrylic resin, and silicone resin, which are used in a combination of two or more kinds.

When used as a filler, the amorphous definite particles are used in an amount of from 2 to 130 parts by weight and, particularly, from 5 to 100 parts by weight per 100 parts of the thermoplastic resin, thermosetting resin or elastomer.

As a coating material to be blended with the amorphous definite particles of the present invention, furthermore, there can be exemplified a coating material comprising at least one of the above-mentioned thermosetting resins, or thermoplastic resin coating materials such as vinyl chloride-vinyl acetate copolymer, vinyl chloride-maleic acid copolymer, vinyl chloride-maleic acid-vinyl acetate copolymer, acrylic polymer and saturated polyester resin. These resin coating materials may be used in a single kind or in a combination of two or more kinds.

When used as a blending agent for the coating materials, it is desired that the amorphous definite particles are blended in an amount of from 2 to 130 parts by weight and, particularly, from 10 to 100 parts by weight per 100 parts by weight of the solid resin component in the coating material, thereby to impart delustering to the coated film or to enhance the insulating property.

EXAMPLES

The invention will now be described in further detail by way of the Examples.

Example 1

Described below are a process for preparing a spherical Pc-type zeolite having notched surfaces and having a low $SiO_2/Al_2O_3$ composition ratio by using a sodium silicate solution (22% by weight of $SiO_2$ and 7.2% by weight of $Na_2O$) in which are dissolved cullets of sodium silicate, sodium aluminate (25.3% by weight of $Al_2O_3$, and 19.1% by weight of $Na_2O$) and caustic soda, and for preparing lowly hygroscopic amorphous silica-alumina spherical particles from the Pc-type zeolite and an acid-treated product thereof of the present invention, and their properties.

By using the above-mentioned three kinds of starting materials, the sodium aluminate solution was heated at 90° C. and stirred, and to which was mixed sodium silicate solution heated at 75° C. over a period of 12 minutes (maintaining a temperature of not lower than 80° C.) such that the total amount of the reaction solution was 5 kg in a 10-liter stainless steel container, in order to form a sodium aluminosilicate which as a whole was in a homogeneous gel-like form having the below-mentioned molar composition:

$Na_2O/SiO_2=1.0$
$SiO_2/Al_2O_3=3.0$
$H_2O/Na_2O=70$

Then, the gel was heated at 95° C. for about 12 hours with vigorous stirring to obtain the Pc-type spherical zeolite particles of the present invention, followed by filtration, washing and drying to obtain a cake thereof. The cake was pulverized by using a sample mill and a jet mill to obtain Pc-type spherical zeolite particles (sample No. 1-1) maintaining an yield of 99%.

(Turning into Amorphous Form)

By using part of the Pc-type zeolite cake of before being dried, 5 liters of an aqueous slurry was prepared having a solid component concentration of 25%, and to which was gradually added about 1.4 liters of sulfuric acid of a concentration of 14% with stirring. The mixture was stirred for about one hour, filtered, washed with water, dried at 110° C., and was pulverized by using the sample mill to obtain an acid-treated product thereof (sample No. 1-2). The sample No. 1-2 was calcined at a temperature of 450° C. and was pulverized by using the jet mill to obtain amorphous and spherical silica-alumina particles of the present invention (sample No. 1-3). FIGS. 1, 2 and 3 are scanning-type electron microphotographs and X-ray diffraction diagrams of the samples Nos. 1-1 and 1-3. FIG. 3 also shows the X-ray diffraction diagram of the sample No. 1-2.

Next, amorphous and spherical silica-alumina particles (calcined at 430° C.) (sample No. 1-4) of the invention were prepared in the same manner as that for preparing the sample No. 1-2 but effecting the treatment with acid by using 14% sulfuric acid in an amount of 1.1 liters.

Moreover, amorphous and spherical silica-alumina particles (calcined at 430° C.)(samples No. 1-5) were prepared in the same manner as described above but changing the molar compositions for preparing the Pc-type zeolite of Example 1 as described below. Here, the sample No. 1-5 was treated with acid by using sulfuric acid in an amount of 0.88 liters.

$Na_2O/SiO_2=1.7$
$SiO_2/Al_2O_3=2.5$
$H_2O/Na_2O=43$

The molar ratios $SiO_2/Al_2O_3$ of the Pc-type zeolite of the sample No. 1-5 of before being treated with acid was 2.26.

Comparative Example 1

The Pc-type spherical zeolite particles (sample No. H-1) having notched surfaces and having the following molar composition were prepared by using a sodium silicate solution, sodium aluminate and caustic soda, and were treated with an acid (14% sulfuric acid, 1.4 liters) in the same manner as in Example 1, followed by drying at 110° C. (dried product: sample No. H-2) and at 450° C. (calcined product: sample No. H-3). FIG. 4 shows their X-ray diffraction diagrams of H-1, H-2 and H-3. The sample No. H-1 was obtained maintaining an yield of 89%.

$Na_2O/SiO_2=0.7$
$SiO_2/Al_2O_3=6.0$
$H_2O/Na_2O=60$

Properties of the resin filler particles used in the present invention were measured by the methods described below, and the results were shown in Table 1.

1. Particle Diameter

Fifty representative particles were selected from a photographic image obtained by using a scanning-type electron microscope (Hitachi S-570), and the diameters of the particle images were measured by using a scale and were regarded to be particle diameters.

2. Specific Surface Area

Measured in accordance with the BET method by using Sorptomatic Series 1800 manufactured by Carlo Elba Co.

3. Bulk Density

Measured in compliance with JIS K-6220.6.8.

4. Moisture Regain

About 1 g of the sample was introduced into a 40×40 mm weighing bottle of which the weight has been measured in advance, dried in an electric high-temperature dryer heated at 150° C. for about 3 hours, and was then left to cool in a desiccator. Then, sample was accurately weighed for its weight, introduced into a desiccator that has been adjusted in advance at a relative humidity of 90% with sulfuric acid, and was measured for its weight after 72 hours have passed.

5. Oil-absorbing Amount

Measured in compliance with JIS K-6220.6.21.

6. pH

The pH of a 5% aqueous dispersion was found in compliance with JIS K-5101.26.

7. Refractive Index

First, a solvent (α-bromonaphthalene, kerosene) of which the refractive index has been known was prepared by using the Abbe's refractometer. Then, according to Larsen's oil immersion, several milligrams of the sample powder was put on a slide glass, a drop of the solvent of which the refractive index has been known was added, a cover glass was placed thereon and, after the solvent has permeated to a sufficient degree, the movement of Becke line was observed through an optical microscope.

8. X-ray Diffraction

Measured under the following conditions by using a Geiger-Flex RAD-1B System manufactured by Rigaku Co.

| Target | Cu |
|---|---|
| Filter | Ni |
| Voltage | 35 kv |
| Current | 15 mA |
| Full-scale count | 8000 c/s |
| Scanning speed | 2 deg/min |
| Time constant | 1 sec |
| Slit | DS 1 deg RS 0.3 mm SS 1 deg |
| Irradiation | 6 deg |

Example 2

Resin films such as of polyethylene, polypropylene and, particularly, polypropylene containing halogen-containing catalyst residue, straight-chain low-density polyethylene produced by using a metallocene catalyst and ethylene-vinyl acetate copolymer (EVA) blended with lowly hygroscopic amorphous and spherical silica-alumina particles (sample No. 1-3) obtained according to Example 1 of the present invention, were evaluated for their transparency, AB property, scratch property, pinking property, resistance against turning into yellow and temperature retaining property.

(Testing Methods)

9. Blocking Property

Two pieces of films were overlapped one upon the other, a load of 200g/cm$^2$ was applied, left to stand at 40° C. for 24 hours, and the easiness for peeling the films were evaluated in the following manner;

○: Peels without resistance,

Δ: Peels difficultly,

×: Peels very difficultly.

10. Haze

Measured in compliance with JIS K-6714 by using an Automatic Digital Haze Meter NDH-20D manufactured by Nippon Denshoku Co.

11. Scratch Property

Two pieces of films after 5 hours have passed from their formation were overlapped one upon the other, and were rubbed with a finger. The degree of getting scarred was evaluated in the following manner;

○: Not almost scarred,

Δ: Scarred a little,

×: Scarred.

12. Transparency

White light transmission factor of a sample sheet was measured by using a color-difference meter, Model 1001DP, manufactured by Nippon Denshoku Kogyo Co.

13. Resistance Against Turning into Yellow

The sheet was introduced into a constant-temperature vessel maintained at 85° C., 90%RH and was left to stand for 24 hours. The hue on the surface of the sheet was measured by using a color-difference meter, Model 1100P, manufactured by Nippon Denshoku Kogyo Co., to find an N-value (degree of yellow color). The smaller the N-value, the superior the resistance against turning into yellow.

14. Dispersion Property

The sheet was evaluated for its dispersion property by naked eyes.

15. Temperature Retaining Property

By using the sample film, a tunnel frame of the shape of a semicircular cylinder of a diameter of 20 cm and a length of 1 m was installed on the ground, and a temperature at the central portion in the tunnel frame was measured at night (3 o'clock in the morning). A temperature difference (ΔT) was measured from a temperature in the similar tunnel frame obtained by using a film without blended with the temperature retaining agent, in order to evaluate the temperature retaining effect. In the present invention, the greater the value ΔT, the higher the temperature retaining property.

(2-1: Evaluation by Using a Polyethylene Resin)

100 Parts by weight of an ethylene-hexene-1 copolymer prepared by using the metallocene catalyst having a melt flow rate of 2.6 g/10 min and a density of 0.911 kg/cm$^3$ was blended with 20 parts by weight of a product (trade name: Mizukarac, average particle diameter of 2.8 μm) obtained by calcining a lithium-aluminum hydroxide carbonate at 300° C. (produced by Mizusawa Kagaku Kogyo Co.), 0.5 parts by weight of the sample No. 1-3 of the present invention, and 0.01 parts by weight of Irganox 1035, and the mixture was kneaded and granulated at a temperature of 210° C. to prepare a master batch. The thus prepared master batch and the above-mentioned copolymer were mixed together at a rate of 75:25, and to 100 parts by weight of this mixture was added 0.2 parts of Irganox B-225. The mixture was then pelletized by an extruder at a temperature of 180° C. The pellets were then inflated to obtain a 40 μm-thick film.

The film was evaluated to possess a haze of 2.8%, good AB property (○) and good scratch property (○), and exhibited a yellow color degree (N-value) of 12 in the testing of resistance against turning into yellow, excellent resistance against turning into yellow, and temperature retaining property (°C.) of 1.6, manifesting excellent temperature retaining property. The film without containing the sample No. 1-3 exhibited a haze of 1.9%.

(2-2: Evaluation by Using a Polypropylene Resin)

To 100 parts by weight of a polypropylene film resin powder (Hipole F657P produced by Mitsui Sekiyu Kagaku Co.) were added 0.15 parts of a 2,6-ditert-butyl paracresole, 0.1 parts of calcium stearate and 0.09 parts of the sample No. 1-3 of the present invention. The mixture was mixed together using a super mixer for one minute, melt-mixed and pelletized by using a monoaxial extruder at a kneading temperature of 230° C. From the pellets were formed a film by using a T-die. Then, by using biaxial stretch forming machine, the film was stretched into 5 times in the longitudinal direction and 10 times in the transverse direction to obtain a 30 μm-thick biaxially stretched film.

The film exhibited a haze of 2.3%, good AB property (○) and good scratch property (○), and normal resistance against turning into yellow. The film without containing the sample No. 1-3 exhibited a haze of 1.8%.

Furthermore, a resin composition was prepared by adding 0.2 parts of Mizukarac produced by Mizusawa Kagaku Kogyo Co., 0.08 parts of the sample No. 1-3 of the present invention and 0.1 parts of erucic acid amide to 100 parts by weight of a polypropylene resin containing a halogen-containing catalyst residue. The resin composition was pelletized at 260° C., introduced into a metal mold of a stainless steel plate of a size of a thickness of 1 mm, and a height and a width of 100 mm×100 mm, sandwiched between a thick ferrotype board for photography and a 2 mm-thick aluminum board that are placed one upon the other, pressed at 230° C. for 30 minutes, transferred into a cooling press of 30±5° C., and was cooled under a pressure of about 50 kg/cm$^2$ per the molding projection area. After the temperature of the metal mold has dropped to lower than 40° C., a 1 mm-thick polypropylene sheet was obtained.

The polypropylene sheet exhibited an yellow color degree (N-value) of 12 in the testing of resistance against turning into yellow, exhibited excellent resistance against turning into yellow, and exhibited very good sheet dispersion property as observed by eyes.

(2-3: Evaluation by Using an Ethylene-vinyl Acetate Copolymer Resin (EVA))

A resin composition comprising 100 parts by weight of an EVA resin containing 15% of vinyl acetate and having MI=1.5, 0.1 parts by weight of a benzotriazole-type ultraviolet ray-absorbing agent, 0.1 parts by weight of a hindered amine-type antioxidizing agent, 4 parts by weight of Mizukarac which is a temperature retaining agent, and 0.5 parts by weight of the sample No. 1-3 of the present invention, were stirred and kneaded by using the Henschel's mixer. The obtained kneaded product was pelletized by using a biaxial extruder at a temperature of 150° C. and was then subjected to the inflation molding to obtain a film having a width of 30 cm and a thickness of 100 μm. The film was evaluated for its temperature retaining property, AB property and transparency.

The film exhibited temperature retaining property of as excellent as 1.7° C., good AB property and favorable transparency as observed by eyes.

Comparative Example 2

Evaluated below is a film of an olefin resin composition obtained by using, as an AB agent, the amorphous and spherical silica-alumina particles of the sample No. H-3 having a pH of 9.6 and a moisture-absorbing amount of 13.7% of Comparative Example 1.

(2H-1: Comparative Evaluation by Using a Polyethylene Resin)

The film of the polyethylene resin obtained by using the metallocene catalyst of Example 2 was evaluated in the same manner as the film evaluation (2-1) of Example 2 but using the sample No. H-3 instead of the sample No. 1-3 of the present invention which is the AB agent.

As a result, the film was slightly colored in pink (pinking), and the yellow color degree (N-value) was 13.9 in the testing of resistance against turning into yellow. Moreover, the film was swollen due to foaming and contained fine bubbles, and possessed low transparency as observed by eyes compared with the film of evaluation (2-1).

Comparative Example 3

A film of a polyethylene resin composition was evaluated in the same manner as in Comparative Example 2 but using, as an AB agent, the amorphous and spherical particles of Ca ion-exchanged Pc-type zeolite (Ig-loss(%): 4.9, moisture regain (%): 5.2, pH: 10.5) disclosed in Japanese Patent Publication No. 17217/1994 instead of using the sample No. H-3 of the film comparative evaluation (2H-1) of Comparative Example 2.

The film was not foamed, was not swollen, or did not contain bubbles, and exhibited very good AB property, transparency, resistance against turning into yellow and scratch property. However, the film was colored in pink (pinking) to a considerable degree.

TABLE 1

| Sample No. | 1-1 | 1-2 | 1-3 | 1-4 | 1-5 | 11-1 | 11-2 | 11-3 |
|---|---|---|---|---|---|---|---|---|
| Bulk density (g/ml) | 0.71 | 0.68 | 0.69 | 0.70 | 0.63 | 0.68 | 0.66 | 0.67 |
| Specific surface area (m$^2$/g) | — | — | 38 | 36 | — | — | 26 | 28 |
| Oil-absorbing amount (ml/100 g) | 58 | 50 | 44 | 52 | 62 | 56 | 51 | 40 |
| pH | 10.9 | 7.6 | 7.9 | 8.7 | 6.7 | 11.1 | 9.1 | 9.3 |
| Moisture regain (%) | 22.0 | — | 3.7 | 3.9 | 4.0 | 21.5 | — | 13.5 |
| Refractive index | 1.45 | 1.46 | 1.46 | 1.46 | 1.46 | 1.45 | 1.46 | 1.46 |
| Average particle diameter (μm) | 1.8 | 1.8 | 1.8 | 1.8 | 1.6 | 2.4 | 2.4 | 2.4 |
| Chemical Composition (%) dried at 110° C. | | | | | | | | |
| Ig-loss | 10.8 | 12.9 | 1.9 | 2.5 | 2.0 | 13.0 | 12.9 | 8.0 |
| SiO$_2$ | 45.0 | 52.0 | 59.1 | 57.6 | 56.5 | 49.2 | 55.7 | 58.6 |
| Al$_2$O$_3$ | 27.3 | 29.5 | 33.5 | 33.7 | 35.3 | 23.9 | 22.4 | 23.6 |
| Na$_2$O | 16.0 | 5.2 | 5.9 | 6.1 | 6.0 | 15.0 | 10.0 | 10.5 |
| SiO$_2$/Al$_2$O$_3$ molar ratio | 2.80 | 2.99 | 2.99 | 2.90 | 2.71 | 3.50 | 4.23 | 4.21 |

Example 3

By using the same starting material as that of Example 1, the sodium aluminate solution was heated at 90° C. and stirred, and to which was mixed a sodium silicate solution heated at 80° C. over a period of about 4 minutes such that the total amount of the reaction solution was 1.75 kg in a 2-liter stainless steel container, in order to form a sodium aluminosilicate which as a whole was in a homogeneous gel-like form having the below-mentioned molar composition:

Na$_2$O/SiO$_2$=1.71

SiO$_2$/Al$_2$O$_3$=2.52

H$_2$O/Na$_2$O=44

Then, the gel was reacted for about 6 hours being heated at 90° C. with vigorous stirring, and was filtered, washed with water, and dried to obtain the Pc-type spherical zeolite particles (sample No. 1-7) of the present invention. The molar ratio SiO$_2$/Al$_2$O$_3$ was 2.25.

(Turning into Amorphous Form)

Figure 5:
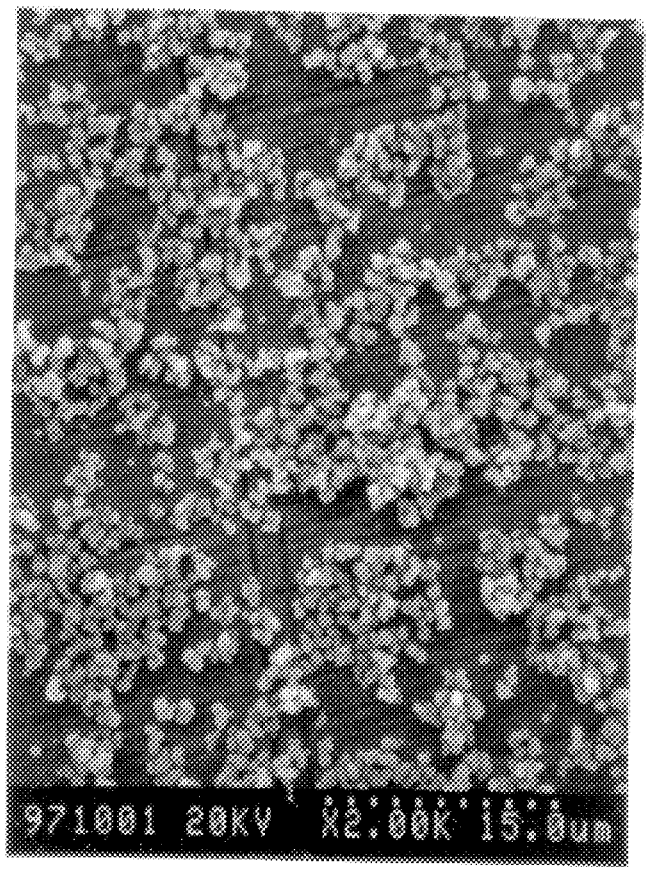
FIG. 5 is a scanning-type electron microphotograph showing particulate structure of Pc-type spherical zeolite particles (sample No. 1-7) according to the present invention.
Figure 6:
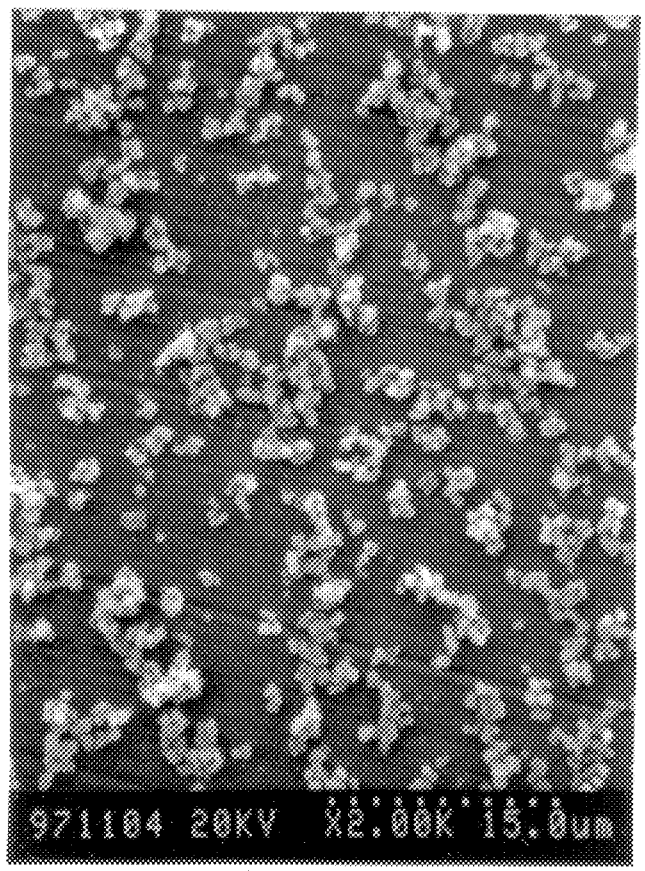
FIG. 6 is a scanning-type electron microphotograph showing particulate structure of amorphous and spherical silica-alumina particles (sample No. 1-9) according to the present invention.
Figure 7:
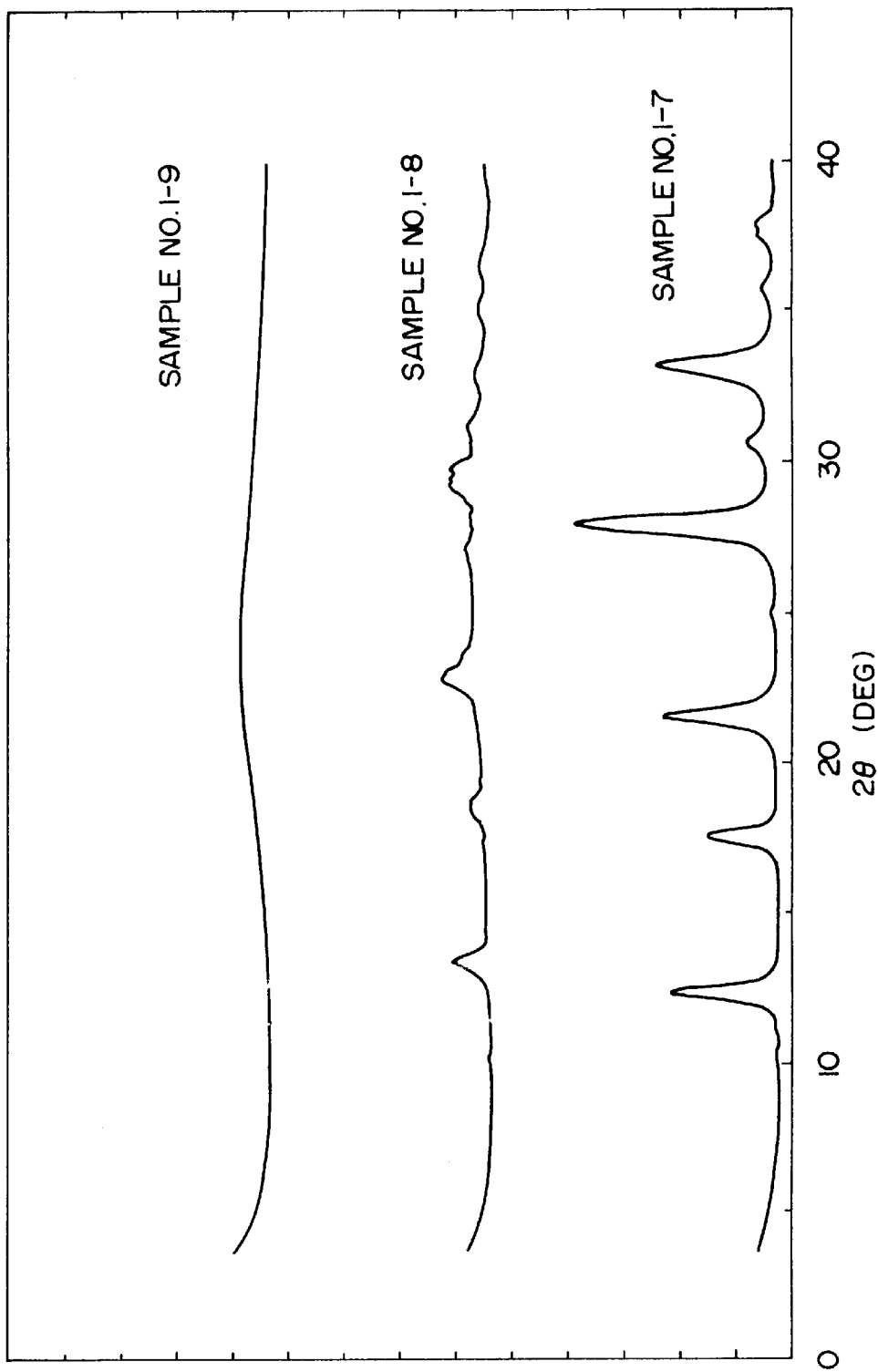
FIG. 7 is a diagram of X-ray diffraction of the samples Nos. 1-7, 1-8 and 1-9 of the Pc-type zeolite and of the acid-treated products thereof obtained in Example 3 of the present invention.
Figure 8:
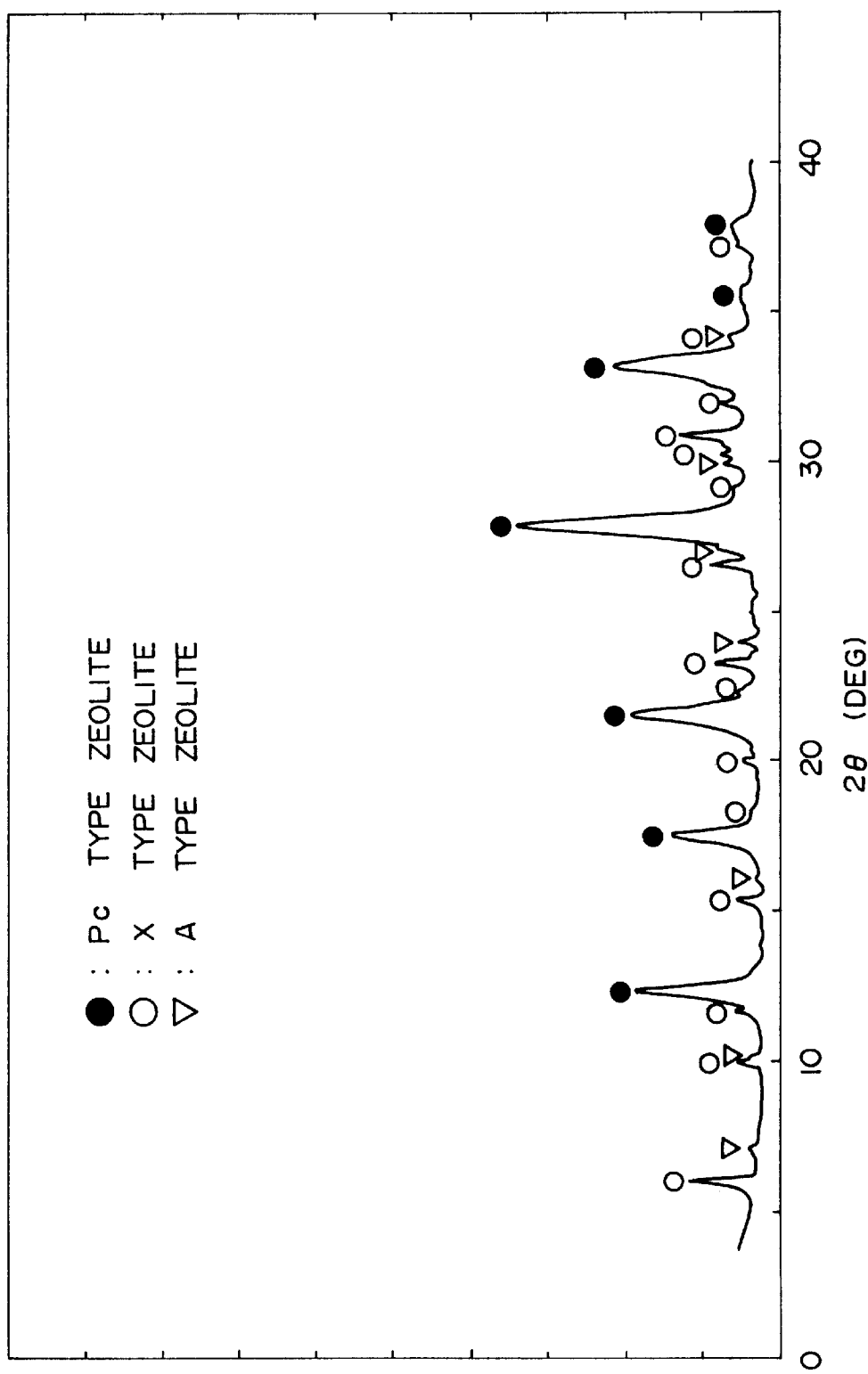
FIG. 8 is a diagram of X-ray diffraction of a mixture of Pc-type zeolite, X-type zeolite and A-type zeolite obtained in Comparative Example 5.

By using part of the Pc-type zeolite cake of before being dried, 154 g of an aqueous slurry having a solid component concentration of 15% was prepared. To this slurry was added about 70 ml of sulfuric acid of a concentration of 6.2% over a period of about 3 hours, and the mixture was stirred for one hour. The mixture was then filtered, washed with water, dried at 110° C., and was pulverized in a mortar to obtain an acid-treated product (sample No. 1-8). The sample was calcined at 550° C. for one hour to obtain amorphous and spherical silica-alumina particles (sample No. 1-9) of the present invention. FIGS. 5 and 6 are scanning-type electron microphotographs of the samples Nos. 1-7 and 1-9. FIG. 7 is a diagram of X-ray diffraction of the samples Nos. 1-7, 1-8 and 1-9. Table 2 shows physical values and compositions of the samples Nos. 1-7 and 1-9.

TABLE 2

| Sample No. | 1-7 | 1-9 |
|---|---|---|
| Bulk density (g/ml) | 0.55 | 0.52 |
| Specific surface area (m²/g) | — | — |
| Oil-absorbing amount (ml/100 g) | 74 | 76 |
| pH | 11.3 | 9.8 |
| Moisture regain (%) | 20.5 | 3.7 |
| Refractive index | 1.46 | 1.47 |
| Average particle diameter (μm) | 0.8 | 1.1 |
| Chemical Composition (%) dried at 110° C. | | |
| Ig-loss | 7.6 | 1.2 |
| $SiO_2$ | 41.8 | 49.6 |
| $Al_2O_3$ | 31.5 | 38.9 |
| $Na_2O$ | 19.0 | 9.8 |
| $SiO_2/Al_2O_3$ molar ratio | 2.25 | 2.16 |

Example 4

By using the same starting material as that of Example 1, the sodium aluminate solution was heated at 90° C. and stirred, and to which was mixed sodium silicate solution heated at 75° C. over a period of 12 minutes (maintaining a temperature of not lower than 80° C.) such that the total amount of the reaction solution was 5 kg in a 10-liter stainless steel container, in order to form a sodium aluminosilicate which as a whole was in a homogeneous gel-like form having the below-mentioned molar composition:

$Na_2O/SiO_2$=0.85

$SiO_2/Al_2O_3$=4.00

$H_2O/Na_2O$=70

Then, the gel was reacted for about 20 hours being heated at 95° C. with vigorous stirring, and was filtered, washed with water, and dried to obtain a cake which was then pulverized by using the sample mill to obtain Pc-type spherical zeolite particles (sample No. 1-10). The molar ratio $SiO_2/Al_2O_3$ of the sample was 3.19.

(Turning into Amorphous Form)

By using part of the above Pc-type zeolite cake of before being dried, an aqueous slurry having a solid component concentration of 25% was prepared. To this slurry was added about 1.4 liters of sulfuric acid of a concentration of 14% over a period of about 3 hours, and the mixture was stirred for one hour. The mixture was then filtered, washed, dried at 110° C., and was pulverized using the sample mill to obtain an acid-treated product (sample No. 1-11). The sample was calcined at 550° C. for one hour to obtain amorphous and spherical silica-alumina particles (sample No. 1-12) of the present invention. Table 3 shows physical values and compositions of the samples Nos. 1-10, 1-11 and 1-12.

TABLE 3

| Sample No. | 1-10 | 1-11 | 1-12 |
|---|---|---|---|
| Bulk density (g/ml) | 0.75 | 0.73 | 0.73 |
| Specific surface area (m²/g) | — | — | — |
| Oil-absorbing amount (ml/100 g) | 52 | 50 | 47 |
| pH | 11.0 | 8.7 | 8.9 |
| Moisture regain (%) | 25.0 | — | 4.5 |
| Refractive index | 1.45 | 1.46 | 1.46 |
| Average particle diameter (μm) | 7.2 | 7.2 | 7.2 |
| Chemical Composition (%) dried at 110° C. | | | |
| Ig-loss | 7.0 | 13.0 | 3.0 |
| $SiO_2$ | 48.9 | 53.4 | 60.0 |
| $Al_2O_3$ | 26.5 | 28.1 | 31.0 |
| $Na_2O$ | 17 | 6.0 | 6.2 |
| $SiO_2/Al_2O_3$ molar ratio | 3.19 | 3.22 | 3.29 |

Comparative Example 4

By using the same starting material as that of Example 1, the sodium aluminate solution was heated at 70%° C. and stirred, and to which was mixed a sodium silicate solution heated at 68° C. over a period of about 4 minutes such that the total amount of the reaction solution was 1.75 kg in a 2-liter stainless steel container, in order to form a sodium aluminosilicate which as a whole was in a homogeneous gel-like form having the below-mentioned molar composition:

$Na_2O/SiO_2$=1.71

$SiO_2/Al_2O_3$=2.52

$H_2O/Na_2O$=44

Then, the gel was aged for one hour being heated at 70° C. with vigorous stirring, and was reacted for about 6 hours at a temperature of 90° C., and was then filtered, washed with water, and dried. The thus obtained sample was not the Pc-type zeolite but was a mixture of the Pc-type zeolite and the X-type zeolite.

Comparative Example 5

By using the same starting material as that of Example 1, the sodium aluminate solution was heated at 47° C. and stirred, and to which was mixed a sodium silicate solution heated at 50° C. over a period of about 4 minutes such that the total amount of the reaction solution was 1.75 kg in the 2-liter stainless steel container, in order to form a sodium aluminosilicate which as a whole was in a homogeneous gel-like form having the below-mentioned molar composition:

$Na_2O/SiO_2$=1.71

$SiO_2/Al_2O_3$=2.52

$H_2O/Na_2O$=44

Then, the gel was aged for one hour being heated at 50° C. with vigorous stirring, and was reacted for about 4 hours at a temperature of 90° C., and was then filtered, washed with water, and dried. The thus obtained sample was not the Pc-type zeolite but was a mixture of the Pc-type zeolite, X-type zeolite and A-type zeolite. FIG. 9 is a diagram of X-ray diffraction of this mixture.

The present invention makes it possible to obtain a film which is not foamed or swollen but has excellent transparency and AB property, by blending the polyolefin resin films with a blending agent comprising amorphous and spherical silica-alumina particles having a pH in the form of an aqueous dispersion of 6 to 10, particularly 6 to 9, a moisture regain at equilibrium (RH90%) of not larger than 10% and having notched surfaces.

By blending the olefin resin film such as of polyethylene or polypropylene containing a halogen-containing catalyst residue with a neutralizing agent and a lithium-aluminum composite hydroxide particles having temperature retaining function, furthermore, it is allowed to obtain a resin film having improved heat stability such as resistance against turning into yellow and excellent transparency, temperature retaining property and AB property.

With the pH of the aqueous dispersion being able to be confined within a range of from 6 to 9, furthermore, the olefinic resin film obtained by using the metallocene catalyst is not foamed or swollen, does not contain fine bubbles, exhibits very good AB property, transparency and scratch property, without coloring trouble or being colored in pink (pinking).

We claim:

1. An additive for resins comprising amorphous particles having (1) a molar ratio $SiO_2/Al_2O_3$ of from 2.1 to 3.3 on the basis of oxides, (2) an average particle diameter of from 0.3 to 10 $\mu$m, (3) a moisture regain at equilibrium (RH90% X 72 hours) of not greater than 10%, (4) a bulk density of from 0.5 to 1.2 g/ml, and (5) a pH in the form of an aqueous suspension of from 6 to 10, said amorphous particles being obtained by carrying out a step of an acid-treating reaction and then heat-treating a Pc zeolite having a spherical particle shape, a notched surface and a molar ratio $SiO_2/Al_2O_3$ of from 2 to 3.4 on the basis of oxides, and said amorphous particles further having the same particulate structure as that of said Pc zeolite.

2. An additive for resins according to claim 1, wherein the pH of the aqueous suspension of said amorphous particles lies over a range of from 6.5 to 9.

3. An additive for resins according to claim 1 or 2, wherein said particles have a spherical particle shape and have a BET specific surface area of not larger than 50 $m^2/g$.

4. A process for preparing amorphous particles comprising carrying out a step of an acid-treating reaction of a Pc zeolite having a spherical particle shape, a notched surface and a molar ratio $SiO_2/Al_2O_3$ of from 2 to 3.4 on the basis of oxides under the conditions where at least a part of sodium in the zeolite is removed and the molar ratio $SiO_2/Al_2O_3$ becomes from 2.1 to 3.3 on the basis of oxides, and a step of calcining the acid-treated product, so that said Pc zeolite is turned into amorphous zeolite.

5. The additive for resins of claim 1, wherein said acid treating step is carried out until the reaction is maintained at pH 2 to 4.

6. The process of claim 4 for preparing amorphous particles wherein said acid treating step is carried out until the reaction is maintained at pH 2 to 4.

* * * * *